United States Patent [19]

LaFleur et al.

[11] Patent Number: 4,817,824

[45] Date of Patent: Apr. 4, 1989

[54] COLLAPSIBLE BULK CONTAINER

[75] Inventors: Arthur E. LaFleur; Arnie LaFleur; Lee LaFleur, all of Manistee, Mich.

[73] Assignee: Custom Packaging Systems, Inc., Manistee, Mich.

[21] Appl. No.: 939,421

[22] Filed: Dec. 8, 1986

[51] Int. Cl.⁴ .......................................... B65D 88/26
[52] U.S. Cl. .................................... 222/105; 222/185;
   222/528; 383/67; 220/402; 206/600
[58] Field of Search ............................... 220/401–404;
   206/511, 599–600; 383/67, 72; 222/94, 105,
   131, 143, 173, 181, 185, 460, 462, 538, 528–530

[56] References Cited

U.S. PATENT DOCUMENTS

| | | | |
|---|---|---|---|
| 824,566 | 6/1906 | Moss | 220/402 |
| 2,432,025 | 12/1947 | Lorenz | 222/105 X |
| 2,720,998 | 10/1955 | Potter | 222/131 X |
| 2,735,568 | 2/1956 | Bitney | 206/600 X |
| 2,973,119 | 2/1961 | Parker | 220/402 X |
| 3,295,738 | 1/1967 | Keuchenius et al. | 206/599 X |
| 3,908,864 | 9/1975 | Capper | 222/105 |
| 4,306,669 | 12/1981 | Grether | 222/105 |
| 4,314,768 | 2/1982 | Goglio et al. | 222/105 X |
| 4,390,051 | 6/1983 | Cuthbertson | 383/67 X |
| 4,421,253 | 12/1983 | Croley | 222/105 |
| 4,518,106 | 5/1985 | LaFleur | 222/460 |
| 4,585,143 | 4/1986 | Fremow et al. | 220/462 |
| 4,596,040 | 6/1986 | LaFleur et al. | 383/7 |
| 4,691,371 | 9/1987 | Derby | 383/62 |

Primary Examiner—Michael S. Huppert
Attorney, Agent, or Firm—Barnes, Kisselle, Raisch, Choate, Whittemore & Hulbert

[57] ABSTRACT

A collapsible and reusable container for liquid and granular materials which has a cage and a generally cubical bag of a flexible material which collapses when empty. The cage has a bottom which supports the filled bag and upstanding side walls surrounding the bag which can be collapsed when the bag is empty to overlie the bottom of the cage to provide a compact package for storage and shipment prior to refilling and reuse of the container.

39 Claims, 6 Drawing Sheets

COLLAPSIBLE BULK CONTAINER

FIELD OF THE INVENTION

This invention relates to shipping and storage containers and more particularly to a bulk container for liquid and granular materials which is collapsible and reusable.

BACKGROUND OF THE INVENTION

Many granular products, and some liquids have been shipped and stored in large bulk bags which may contain as much as a ton or more of material. Some of these bulk bags are flexible and when empty, can be folded to a generally flat condition. One such flexible bag is disclosed and claimed in U.S. Pat. No. 4,596,040.

These bags are generally unsatisfactory for the shipment, stacking and storage of liquids and granular materials which readily flow. Some examples of such liquid materials are syrups, milk, fruit juices, apple sauce, purees, glues, inks, resins, paints, acids, chemicals and other compositions in liquid form, and granular materials such as beans, peas, grains, rice, salt, flour, sugar, dry chemicals, dry cement, minerals, chicken and animal feeds, fertilizers, etc. Since these materials readily flow, if they are stored in flexible bags stacked on top of each other, inlets and outlets of the bags usually leak, bags near the bottom of the pile may burst, and the stack would be so unstable it would readily roll, shift and fall over which would be hazardous and frequently results in spillage and loss of the contents of the bags.

Moreover, if bags filled with these readily flowable materials are transported or otherwise moved, the materials in the bags shift, surge or slosh around with sufficient force to cause the bags to be unstable, roll and even fall over frequently with sufficient force to damage or destroy the bags which results in the loss of their contents.

SUMMARY OF THE INVENTION

Containers of this invention have a generally cubical and collapsible bag of a flexible material received in a cage with a rigid bottom and rigid side walls which can be collapsed from an upstanding position to a knocked-down position generally overlying the bottom. Preferably, the walls and the bottom of the cage are an open grid of metal rods welded together at their points of intersection. Preferably, a shield is disposed between the bag and the walls and bottom of the cage to protect the bag. After the bag is collapsed, the walls of the cage can be knocked down preferably over the bag.

The bag has a closable inlet through which flowable material is admitted to the interior of the bag and preferably a closable discharge spout near or in the bottom of the bag through which the contents of the bag may be removed. Preferably, the bottom of the cage has a central access opening through which a bottom discharge spout can be extended. If desired, a valve can be connected to the discharge spout to control the flow of the contents from the bag. Preferably, shifting of the contents in the bag when the container is being moved is substantially retarded sufficiently to avoid damage to the bag, by straps carried by the cage, overlying the top of the bag and firmly urging at least a portion of the top of the bag into engagement with its contents. Preferably, syphoning out of the bag its liquid contents, through an inlet spout in the top of the bag, is prevented by a boot encircling the spout and tied to it so that the free end of the spout is retained above the top of the bag.

Preferably, the bags are made of woven fabrics or plastic films. For granular materials woven fabric bags are usually preferred, although in some applications a plastic film bag disposed within a woven fabric bag is desirable. For liquids a plastic film bag is needed to prevent leakage and as a safety precaution, it is usually desirable to use two or more plastic film bags disposed one within the other. In some applications for liquids, it is desirable to dispose two or more plastic film bags within a woven fabric bag to protect the plastic film bags from being punctured.

Objects, features and advantages of this invention are to provide a collapsible and reusable container which is eminently suited for shipping, stacking and storing readily flowable liquid and granular materials, which enables several containers to be stacked one on top of another, when so stacked does not burst, leak, shift or roll over, cannot be readily punctured, is not damaged or destroyed while being shipped or moved by the contents shifting, moving or sloshing around within the container, is rugged, durable, when empty readily and easily knocked down into a compact configuration for shipment and storage, readily and easily set up for filling and reuse, has inlets and outlets which can be readily closed, avoids syphoning liquid from a closed inlet, and is of relatively simple design and economical manufacture and assembly.

BRIEF DESCRIPTION OF THE DRAWINGS

These and other objects, features and advantages of this invention will be apparent from the following detailed description, appended claims, and accompanying drawings, in which:

DETAILED DESCRIPTION

Figure 1:
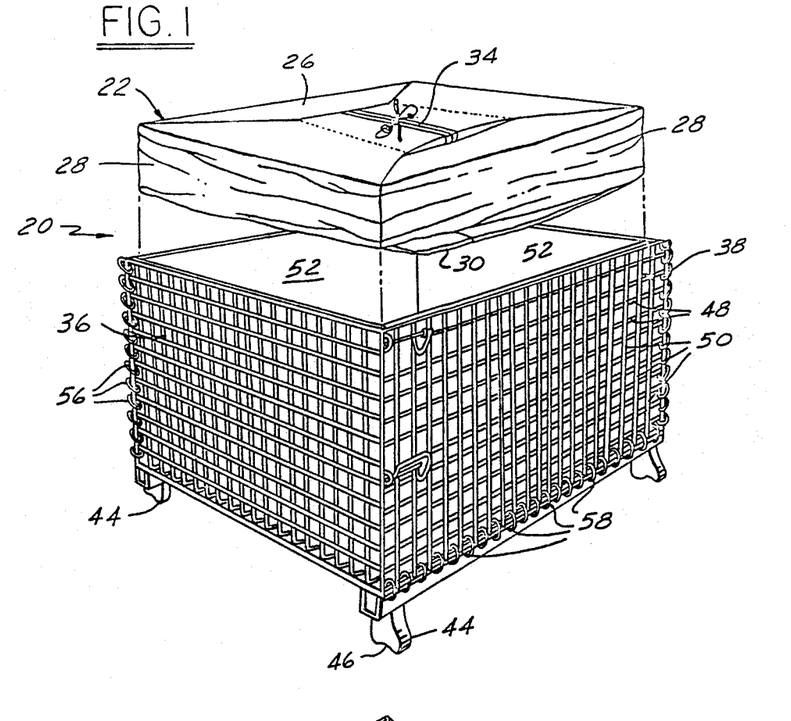
FIG. 1 is a perspective view of the bag and cage of the container of this invention.
Figure 2:
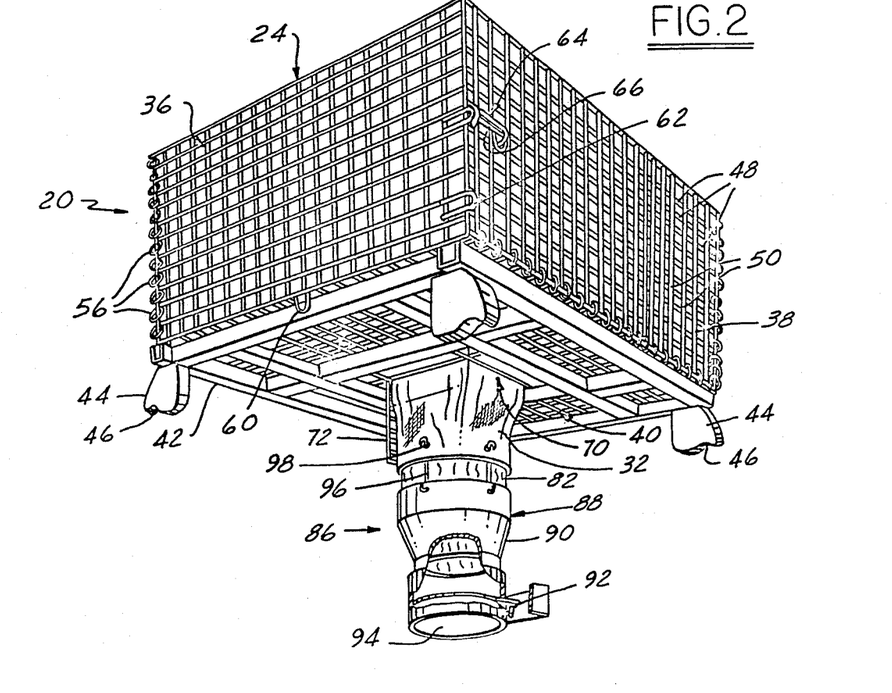
FIG. 2 is another perspective view of the container of FIG. 1 with the bag received in the cage and a discharge valve assembly mounted on the outlet of the bag.
Figure 3:
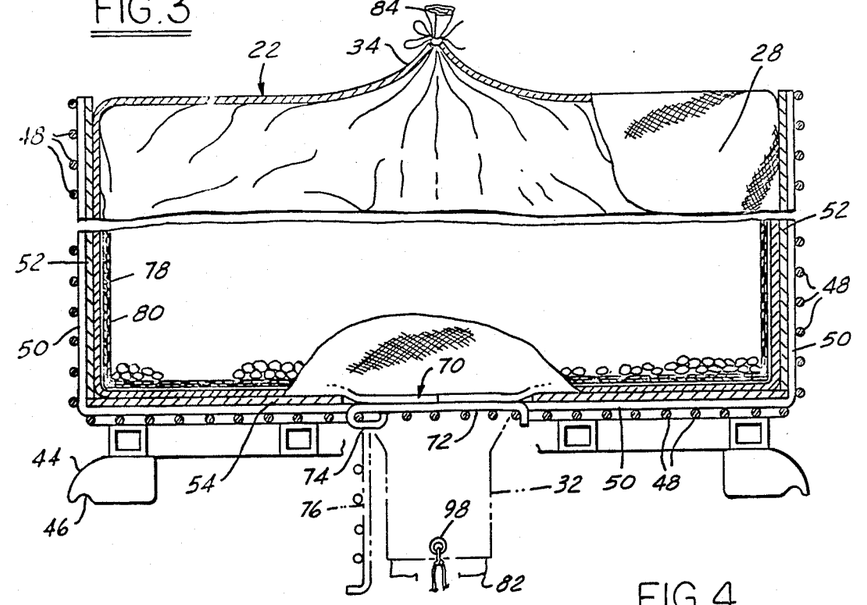
FIG. 3 is a fragmentary side view with portions broken away of the container of FIG. 1.

Referring in more detail to the drawings, FIGS. 1-3 illustrate a collapsible container 20 embodying this invention which has a collapsible bag 22 received in a cage 24. The bag is generally cubical and has a generally flat top 26, side walls 28, and bottom 30 with an outlet boot or spout 32 centrally located in the bottom. Preferably, the bag has a closable inlet boot or spout 34 centrally located in the top, although for some applications the bag can be constructed so that essentially its entire top can be opened and closed.

The cage 24 is generally cubical, preferably open with no top, and has opposed pairs of side walls 36, 38 carried by a bottom 40 fixed to an underlying frame 42. To permit the insertion of tines of a lift truck under the frame for lifting and carrying the container, it is supported by legs 44 fixed to the frame. To permit the cages to be stacked one on top of the other, the legs have notches 46, which when stacked, engage and bear on the top edge of the side walls of an immediately underlying cage.

Preferably, the walls and the bottom are a mesh or an open grid of heavy wire or rods 48, 50 of steel extending transversely to each other and welded together at their points of intersection. To insure that the rods, and particularly the welds and any weld spatter, do not puncture, tear or otherwise damage the bags, shields in the form of separate sheets 52, 54 (FIGS. 1 and 3), are disposed between the bag and the walls and bottom of the cage. If desired, the sheets can be attached to the walls and the bottom. Preferably, the sheets are of a lightweight plastic material, such as high density polyethylene plastic.

In accordance with one feature of this invention, when the bag is empty, the walls of the container can be knocked down to provide a compact package which can be easily shipped and stored for reuse. To enable the walls to be knocked down from their upstanding position, each wall 36 is hinged along one side edge to one of the walls 38 by a spiral rod 56. Each of the walls 54 is similarly hinged adjacent a bottom edge to the bottom 40 of the cage by a spiral rod 58. These hinges permit each wall 36 to be folded back over the wall 38 to which it is hinged and then such wall 38 to be folded over the bottom so that when knocked down, all the walls are generally parallel to and stacked over the bottom. When the walls are moved to the upstanding position, as shown in FIGS. 1 and 2, stops 60 and 62 on the walls 36 engage the bottom and the free end of the walls 38. The walls are releasably retained in their upstanding position by locks 64 with a movable bolt 66 engagable with a loop 68.

As thus far described, suitable collapsible containers with steel wire rods welded together are commercially available from Cargotainer Division of Adrian Fabricators, P.O. Box 518, Adrian, Mich. 49221. These cages are available with various exterior dimensions and load carrying capacities. For most applications, cages are satisfactory which have exterior dimensions of 44 inches in length by 44 inches in width by 40 inches in height and a load carrying capacity of 4,000 pounds. For some applications non-metallic cages may be desirable. Suitable non-metallic cages of structural foam molded polyethylene are commercially available from Xytec Plastics, Inc. of Lakewood-Tacoma, Industrial Park, P.O. Box 99057, Tacoma, Wash. 98499. These plastic cages have exterior dimensions of 44 inches in length by 44 inches in width by 40 inches in height and usually a load-carrying capacity of 2,000 to 2,500 pounds, and in some instances, up to 4,000 pounds.

To facilitate emptying the container, preferably an access opening 70 is provided in the bottom of the cage through which the spout 32 of the bag can be extended. As shown in FIG. 3 this spout can be retained in th cage by a trap door 72 receivable in the opening 70 and pivotally connected by loops 74 so that it can be swung downwardly out of the opening as shown in phantom at 76 in FIG. 3.

In some applications, such as where a bag filled with material will be removed from the cage, it is desirable and usually necessary to make the bag of a woven fabric so that it has sufficient strength to carry its contents. In other applications, such as when th container is used to carry liquids, it is necessary to make the bag of a plastic film to provide a leak-proof bag. In other applications, to protect a plastic bag or to permit it to be lifted when full, it may also be necessary, as shown in FIG. 3, to dispose one or more bags 78,80 of a plastic film within a bag 22 of woven fabric. Preferably, the bags 78,80 have generally the same configuration as and conform to the interior of the bag 22 in which they are inserted. Preferably, each bag 78, 80 also has a discharge spout and an inlet spout 84. Preferably these spouts are longer than and can be extended beyond the corresponding spouts of the bag 22. In use, woven polyethylene fabric and woven polypropylene fabric have been highly satisfactory for making bags of great strength and polyethylene plastic film and polypropylene plastic film with a thickness in the range about 4 to 10 mil are highly satisfactory for making water impervious or leak-proof bags.

In accordance with another feature of this invention, if it is desired to intermittently withdraw only a portion of a granular material from a container, a control valve assembly 86 can be connected to the discharge spouts of the bags, as shown in FIG. 2. This assembly has an outer casing 88 with a hopper section 90 in which the discharge spouts 82 of the plastic film bags are received above a valve member 92 arranged for opening and closing an outlet passageway 94 defined by the casing. The valve assembly is carried by and suspended under the outlet boot or spout 32 of the fabric bag 22 by four circumferentially spaced hooks 96, removably received in four equally circumferentially spaced grommets 98 in the boot. Where it is desired to use the valve assembly 86 with a container having only plastic film bags, the hooks 96 can be hung directly on the wire rods of the bottom of the cage.

The preferred construction and arrangement of the valve assembly 86 is illustrated and claimed in U.S. Pat.

No. 4,518,106 issued on May 21, 1985, the disclosure of which is incorporated herein by reference, and hence the construction, arrangement and operation of this valve assembly will not be described in further detail herein.

When these spouts are being used to remove the contents of the bag, usually the cage is located at a convenient height above the floor to provide easy access to the spouts. If the contents are removed intermittently or over a substantial period of time, usually it is desirable to place the cage on a rack or other support which raises it above the floor so it is at a convenient level to manually grasp and manipulate the spouts or any valve connected thereto.

Figure 4:
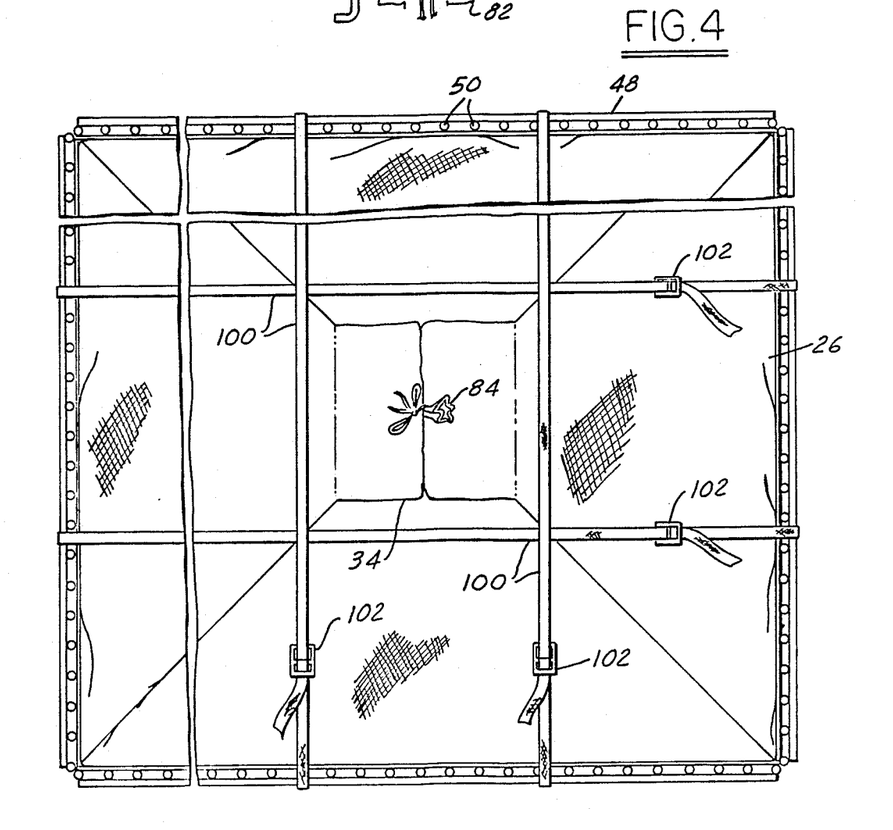
FIG. 4 is a fragmentary top view of the container.

Containers used to transport or move either liquid materials or many granular materials which flow easily, are normally subjected to frequent changes in the speed and/or direction of movement which cause the liquid or granular material to shift, move or slosh around in the bag, and thereby produce forces which frequently would be of sufficient magnitude to damage or destroy the bag and damage the cage of the container. In accordance with another feature of this invention, movement of the liquid or granular material can be sufficiently retarded to prevent any damage to the bag and the cage by positively forcing the top of the bag into firm engagement with the material contained in the bag. As shown in FIG. 4, this can be accomplished by straps 100 overlying the top of the bag with their ends connected to the side walls of the cage at a height below the top of the bag when filled. Preferably the straps have buckles 102 permitting the effective length of the straps to be adjusted. In use, the straps are drawn up or shortened sufficiently to bear on and urge the top of the bag into firm engagement with its contents. Preferably, the straps are drawn up sufficiently to force the underlying portions of the top of the bag into the liquid so that adjacent portions of the top bulge or billow up above the straps. While the theory by which this arrangement of the straps retards movement of the liquid sufficiently to avoid damage is unknown, in practice this arrangement has been found to be highly satisfactory.

For most applications, the inlet spout 84 of a liner plastic film bag be adequately closed so that liquid will not initially leak out of it by wrapping a cord around the inlet spout, drawing it tight and tying it off. However, it has been found that unless the open end of the inlet spout 84 is kept above the top of the bag, a capillary or syphoning action is soon initiated which slowly removes liquid from the bag through the spout so that in a day or so, the container will be substantially emptied. The upper end of the spout can be retained above the top of its bag, and this syphoning or capillary action thereby avoided, by securing the filler spout to the inlet boot 34 of the fabric bag 22 and securing the sides of the boot together to support the spout, as shown FIGS. 5-8.

Figure 5:
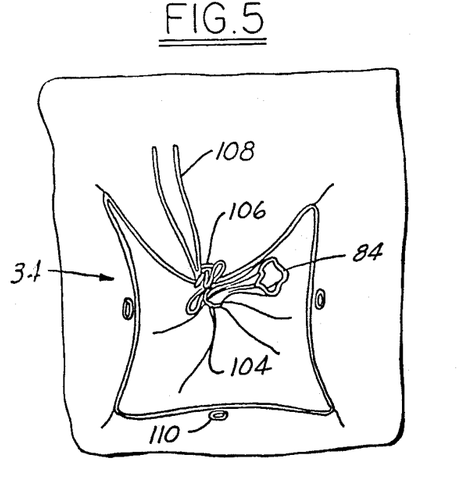
FIGS. 5 through 8 are fragmentary top views of the bag and the inlet spout of a liner illustrating how they are positioned and tied together and closed to prevent liquid from being syphoned out of the container.

As shown in FIG. 5, a cord 104 is tightly wrapped around the filler spout 84 of the plastic film bag, and tied off, preferably with a bow knot, so that it can be easily untied when desired. The tied off filler spout is then secured to the boot of the fabric bag 22, preferably by tying the same cord 104 to the boot through one of the grommets 106. Securing the filler spout 84 to the boot 34 prevents the spout 84 from being drawn away and separated from this boot when the container is emptied through the discharge spout in the bottom of the film bag.

Figure 6:
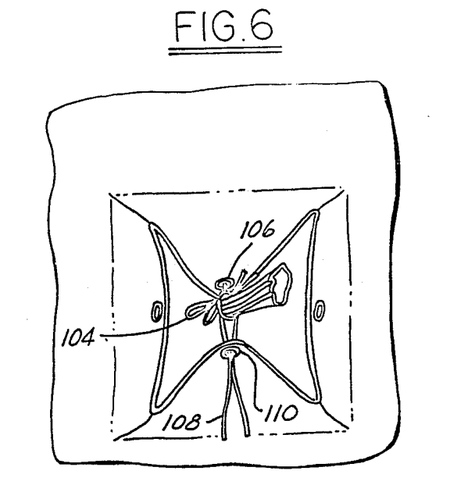
Figure 7:
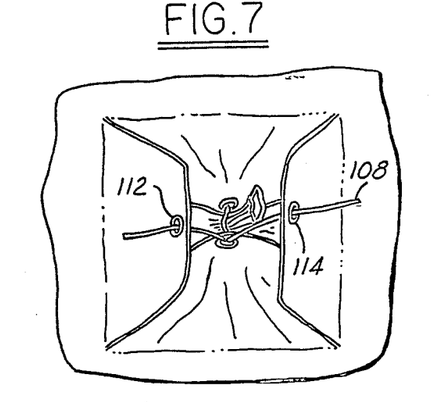
Figure 8:
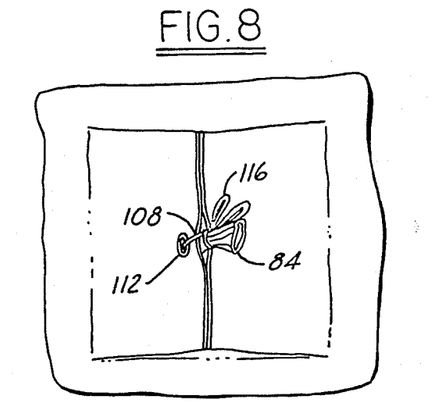
Figure 9:
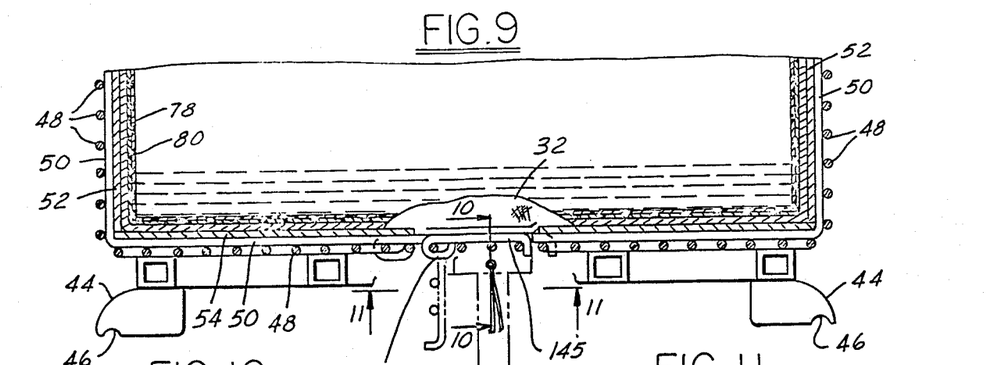
FIG. 9 is a fragmentary sectional view of a modified container illustrating the connection of a discharge spout to a liquid outlet tube and valve assembly.

The sides of the boot 34 are then secured together with the filler spout 84 projecting outwardly between its sides, preferably by another cord 108 although it could be secured by the same cord 104 used to tie off the spout. The bight of the cord 108 is secured to one wall of the boot through an eyelet 106 and then the runs of this cord are passed around the sides of the spout and thence through an eyelet 110 in a generally opposed wall of the boot as shown in FIG. 6. One run then is passed through an eyelet 112 of another boot wall and the other run is passed through an eyelet 114 in a generally opposed boot wall, as shown in FIG. 7. The cord 108 is then drawn up tight to pull the walls of the boot together with the spout 84 therebetween with its free end projecting outwardly beyond and generally about above the boot, and then tied off, as shown in FIG. 9, preferably with a bow knot so it can be readily untied when it is desired to open the boot and spout, such as when refilling the container.

Figure 10:
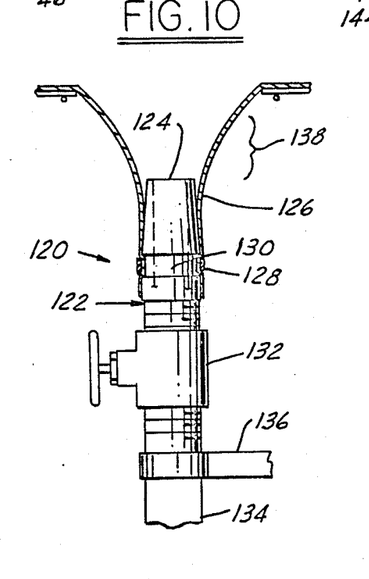
FIG. 10 is a fragmentary sectional view taken generally on line 10—10 of FIG. 9 illustrating in greater detail the discharge spout and outlet tube and valve assembly.

To facilitate intermittent withdraw of liquid from the container an outlet tube and valve assembly 120 can be connected to the discharge spouts of the plastic film bags 78, 80. As shown in FIGS. 9 an 10, a rigid outlet tube 122 having a tapered portion 124 adjacent one end can be inserted into the open end of the discharge spouts 125 and 126 of the film bags 78, 80. The spouts are releasably sealed to the tube by an adjustable clamp 128, such as a hose clamp, which is preferably received in a recess 130 in the tube, to provide a liquid tight seal between the tube and the spouts. Preferably, the clamp is slipped over the spouts before the tube is inserted. The tube is connected to the inlet side of a conventional shut off valve 132 and its outlet is connected to a discharge pipe 134. The outlet tube and valve assembly is supported by an arm 136 which can be connected to a rack or other support on which the container is received so that the valve assembly is positioned at a convenient height above the floor so that it can be easily reached and manually manipulated.

Loss of liquid from the container while the outlet tube 122 is being installed in the spouts 125, 126 can be prevented by releasably clamping together the walls of the spouts top inch them off in an area 138 above that into which the outlet tube is to be inserted. To insure no liquid is lost during shipment and storage of a liquid filled container it is often desirable to heat seal the lower end of the discharge spouts. If the spouts are heat sealed they can be releasably clamped or pinched off first, then cut off just above the heat seals, the outlet tube inserted in the now open end, the spouts clamped to the tube, and then the clamp released above the tube and removed. In this way the tube and valve assembly can be installed without losing any liquid. The spout can be releasably pinched off between two generally opposed flat members moved into firm engagement with the walls of the spouts.

Figure 11:
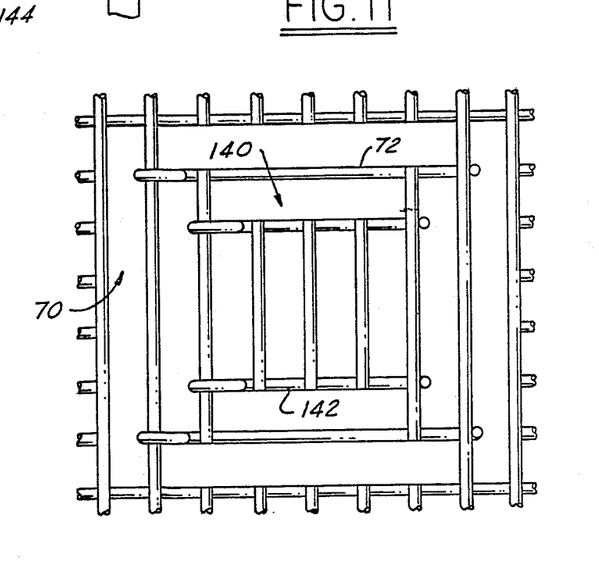
FIG. 11 is a fragmentary view taken generally on the line 11—11 of FIG. 9 and illustrating trap doors covering access holes in the bottom of the cage.

In a liquid filled container in which an outlet tube 122 has been installed it is desirable to support both the bag and the liner therein immediately adjacent the discharge spouts. As shown in FIGS. 9 and 11 this may be accomplished by providing a smaller access opening 140 in the trap door 72. To support and protect the bags and discharge spouts during shipment and storage this opening has a second trap door 142 therein hinged by loops 144 so that it can be swung to the open position, as shown in phantom at 146 in FIG. 9, to provide access to the fabric bag boot 32 and plastic film discharge spouts 125, 126. Usually, for liquids it is desirable to make the spouts 125, 126 with a smaller diameter than that of the spout 82 for granular material.

Form of Bags

A preferred form of the bags is disclosed and claimed in U.S. Pat. No. 4,596,040 issued June 17, 1986, the disclosure of which is incorporated herein by reference. In view of the disclosure of this patent, the preferred form of the bags is only briefly described herein and since the fabric and plastic film bags preferably have substantially the same form, only the form of the fabric bag is expressly described herein.

Figure 12:
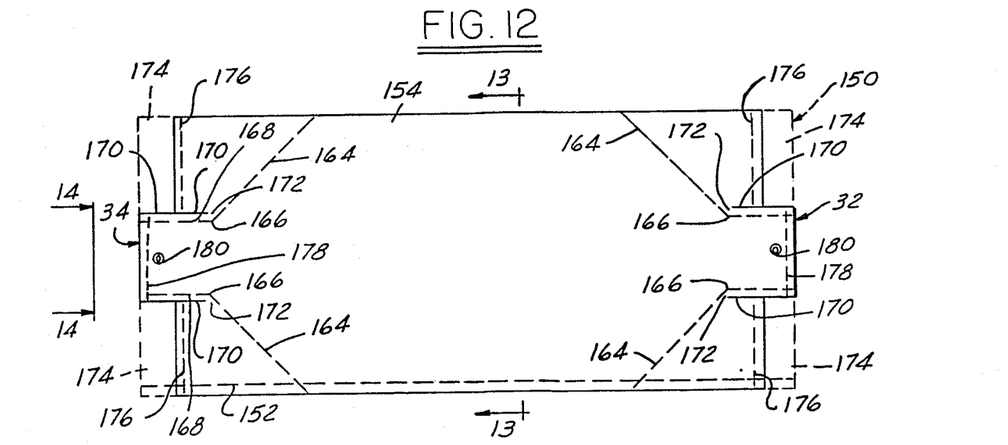
FIG. 12 is a plan view of the bag in a flattened condition.

As shown in FIG. 12, a bag 22 is formed from a tube 150 of a woven fabric or a plastic material. A sheet of material is formed into a tube by sewing or heat sealing the opposite side edges of the material together as at 152. The tubular blank has a pair of flat overlying panels 154, 156 which are interconnected by inwardly folded gussets 158, 160. Since the bag as illustrated is generally square in cross section, each folded gusset 158 and 160 in width is approximately the same as the width of the flat panels 154 and 156. Thus, the fold lines 162 of the gussets extend lengthwise of the tube and lie closely adjacent the longitudinal center line thereof. If in cross section the bag was rectangular with a substantially greater cross sectional width than length, the panels 154 and 156 would be wider than the gussets 158 and 160, and the fold lines 162 of the gussets would be spaced from the longitudinal center line of the tube.

In order to form the blank 150 into a bag with a generally flat and rectangular top and bottom, the four corner portions of the tube are stitched or heat sealed diagonally on opposite sides of the blank as at 164. There are eight such lines of stitching or heat sealing, four extending through panel 154 and the adjacent underlying portion of gusset panels 158 and 160 and the other four extending through panel 156 and the adjacent portions of the overlying gusset panels 158 and 160. These lines 164 extend symmetrically from the opposite side edges of the tubular blank inwardly and toward the adjacent end of the blank and terminate at points 166 which are spaced apart on opposite sides of the longitudinal center line of the blank and which are also spaced inwardly from the opposite ends of the blank. To form the boots or spouts additional lines of stitching or heat sealing 168 extend from the points 166 lengthwise of the blank in parallel relation to the opposite ends of the blank.

Panels 154 and 158 and the intermediate portions of gusset panels 158, 160 are then slitted lengthwise from the opposite ends of the blank inwardly, as at 170 along lines that are parallel and spaced slightly laterally outwardly from the stitch or heat seal lines 168. The severing lines 170 terminate at points 172 which are generally transversely aligned with the intersection points 166 between stitch or heat seal lines 168 and lines 164. Thereafter, at the opposite end portions 174 of the blank and laterally outwardly from the severing lines 170, the end portions of panels 154, 156 and gusset panels 158, 160 are folded over several times and stitched or heat sealed together as at 176. Preferably, for the purpose of eliminating raw edges, the end portions of the flat panels 154, 156 and gusset panels 158, 160, which extend between the severing lines 170 are also folded individually one or more times upon themselves and hemmed by stitching or heat sealing as at 178. Eyelets, cringles or similar fasteners 180 can be secured adjacent the edges, which are hemmed at 178, on the two flat panels 154, 156 and gusset panels 158, 160. When the bag is opened, the flat panels 154, 156 and gusset panels 158, 160 which extend between the stitch or heat seal lines 168 form rectangularly shaped outlet and inlet spouts 32 and 34.

Modified Container

Figure 15:
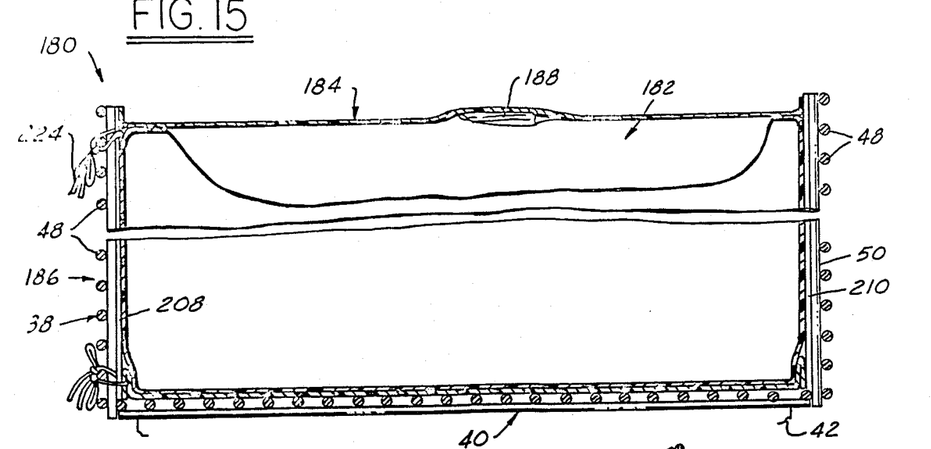
FIG. 15 is a sectional view of another container embodying this invention with a foldable shield and a bag filled with liquid received in a cage.
Figure 16:
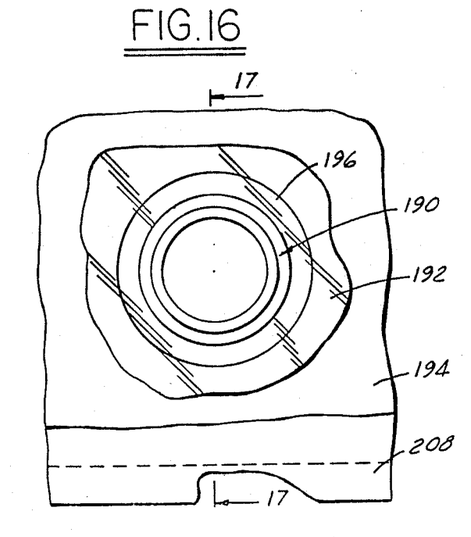
FIG. 16; is a fragmentary side view of the bag illustrating its discharge spout.
Figure 17:
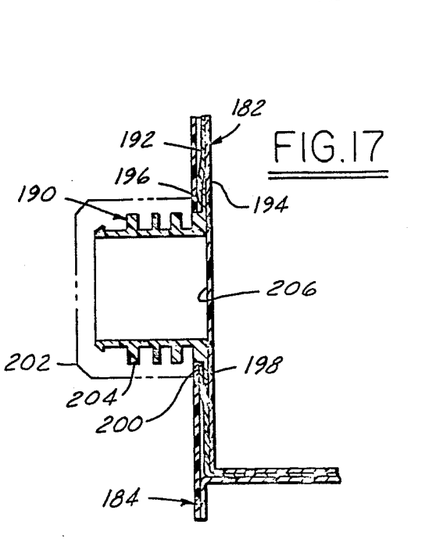
FIG. 17 is a fragmentary sectional view of the discharge spout taken generally on line 17—17 of FIG. 16.
Figure 18:
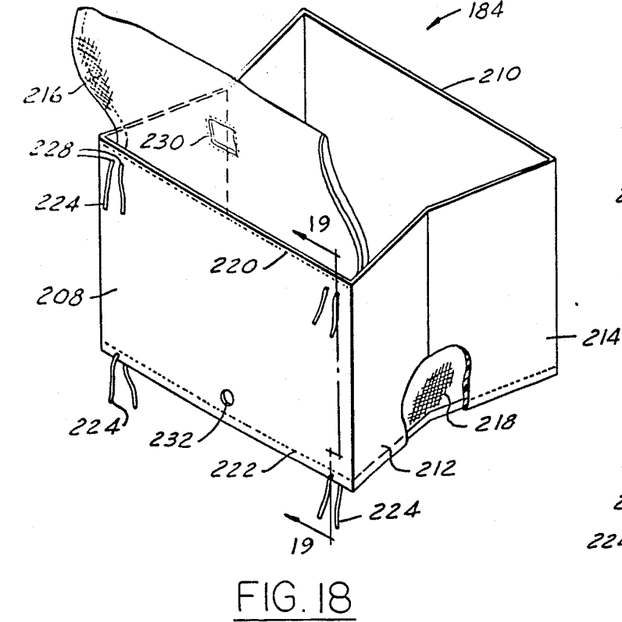
FIG. 18 is a perspective view of the foldable shield of the container of FIG. 15.
Figure 19:
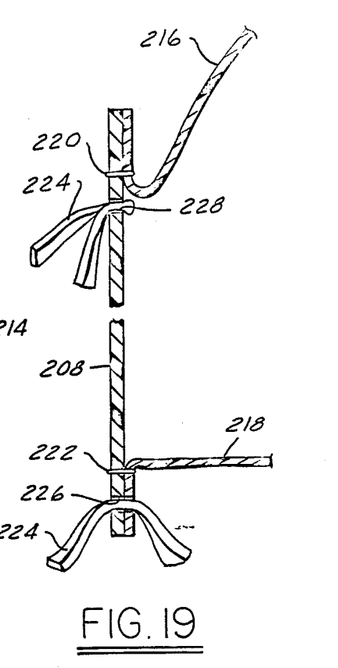
FIG. 19 is an enlarged and fragmentary sectional view taken generally on line 19—19 of FIG. 18 illustrating some of the details of the shield.
Figure 20:
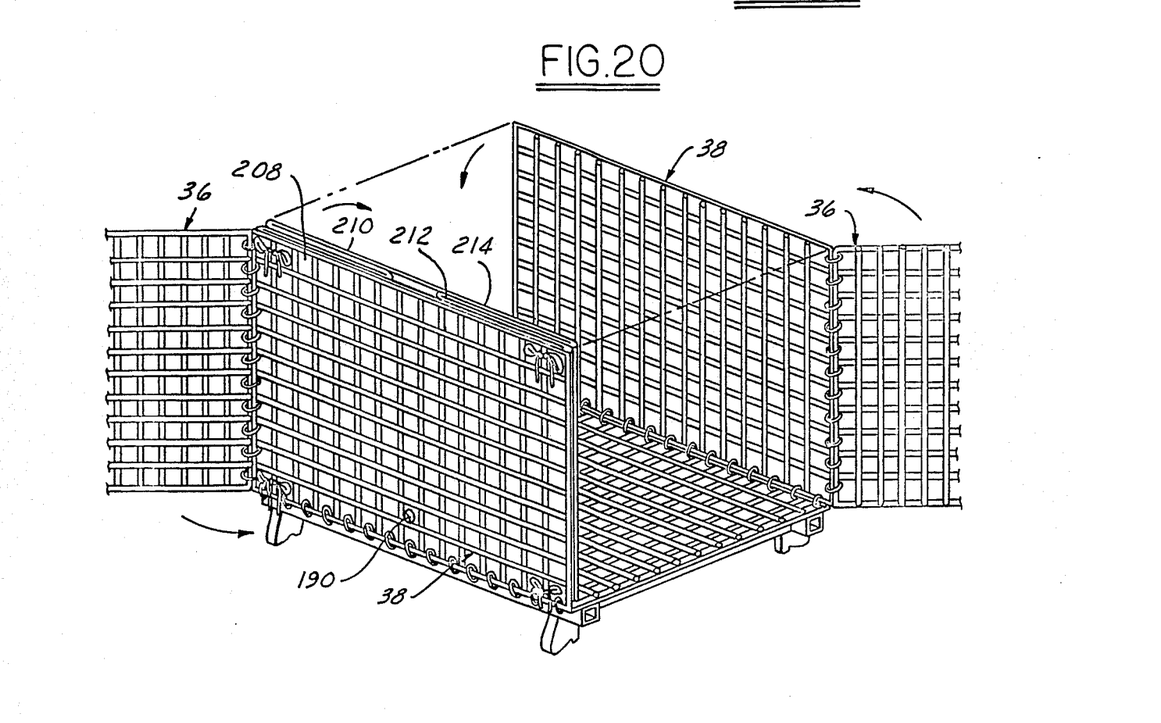
FIG. 20 is a perspective view of the container of FIG. 15 with the bag empty, the shield and bag folded and the walls of the cage released for folding.

FIGS. 15-21 illustrate a modified container 180 which is particularly suitable for liquids. As shown in FIG. 15, this container has a collapsible bag 182 received in a foldable shield 184, both of which are received in a collapsible cage 186. Cage 186 is identical to cage 24 except that it does not have any access opening 70 and trap door 72 in the cage. To facilitate collapsing the container, preferably both the bag 182 and the shield 184 are constructed and arranged so that they can be folded up together in a generally flat and compact arrangement adjacent a side wall of the cage as shown in FIG. 20. Preferably, the bag 182 is constructed in accordance with U.S. Pat. No. 4,596,040 which will readily fold into this generally flat configuration.

The bag 182 has an inlet spout 188 and an outlet spout 190 (FIGS. 16 and 17) in a side wall of the bag and immediately adjacent the bottom. Preferably, the bag is made with two sheets of plastic film 192 and 194, one disposed within the other, and each heat sealed at 196 and 198 to a flange 200 of the outlet spout. Each heat seal 198 and 200 is circumferentially continuous and encircles the neck of the spout. Preferably, this spout is both closed and protected by a closure cap 202 received on threads 204 on the neck of the spout. Preferably, to further insure there is no leakage through the spout, a portion 206 of the inner sheet of plastic film 194 extends over and covers the inner end of the spout. When the spout is first used to remove liquid from the container, the portion 206 of the inner film is pierced by inserting a sharp instrument through the spout. In use, the spout 190 projects through the foldable shield 184 and an opening in a side wall of the cage between the wire rods, as shown in FIG. 20. If desired, the bag 182 can be made with a spout 190 in its bottom, rather than its side, for which it is desirable, but usually unnecessary, to provide an access opening and a trap door in the bottom of the cage.

As shown in FIGS. 18 and 19, the foldable shield 184 preferably has a pair of generally flat side panels 208 and 210 interconnected by gusset panels 212 and 214. All of the panels are preferably self-supporting and hingedly connected together at their adjacent vertical edges. Preferably, the panels are made from a tube of self-supporting plastic material by forming fold lines therein corresponding to the adjacent vertical edges to provide integral and continuously hinged joints which prevent the plastic film bags from being pinched or snagged when the shield is folded up. The tube is formed by heat sealing together the opposite ends of a sheet of plastic material. A sheet of high density polyethylene or polypropylene plastic with a thickness of 20 to 30 mils is highly satisfactory.

Preferably, the shield has a top cover 216 and a bottom 218 of a flexible woven fabric material. To provide a hinged cover, one edge of the top 216 is attached to the panel 208 adjacent its upper end by stitching 220. The bottom is attached to the lower edge of each panel by stitching 222 along a continuous line around the periphery of the shield. When installed in the cage, preferably the shield 184 is attached to one side wall 38 by cords 224 passing through slots 226 and 228 in the panel 208 and tied to a wire rod of the cage. To facilitate access to the inlet spout 188 of the bag, preferably there is an access hole 230 through the top of the bag. To provide access to the outlet spout 190 a clearance hole 232 is provided in the panel 208 of the shield.

Figure 21:
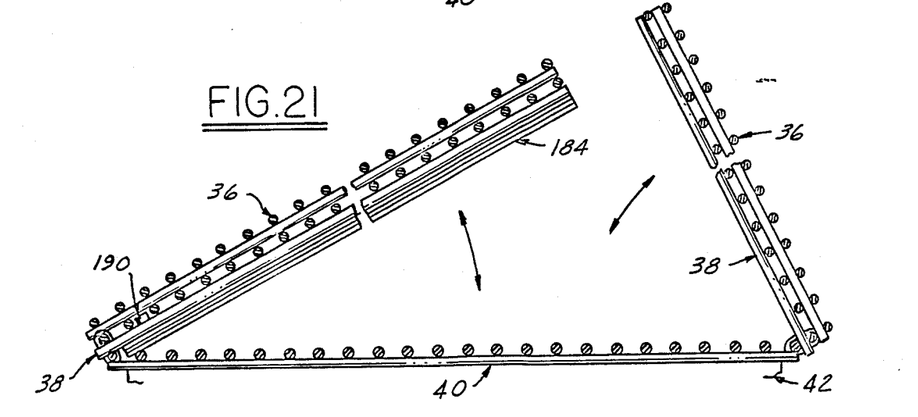
FIG. 21 is a side view of the container of FIG. 15 with the cage walls partially collapsed.

When the bag is empty, as shown in FIG. 20, the shield 184 can be folded into a generally flat and compact configuration with the gusset panels 212 and 214 received between the wall panels 208 and 210. Preferably, the bag will also be simultaneously collapsed with and inside of the shield. Each cage wall 36 is released and pivoted (FIG. 20) through 180° to overlie its associated wall 38. Subsequently, as shown in FIGS. 21, one wall 38 and then the other is pivotally moved through an arc of 90° to overlie the bottom of the cage, which results in the container being collapsed into a compact package for storage and shipment prior to being set up for reuse.

Setup and Use of the Containers

Figure 13:
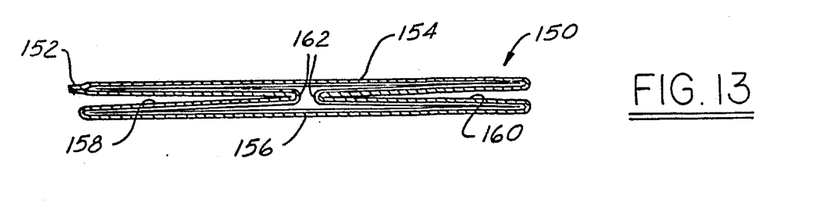
FIG. 13 is a sectional view taken generally along the line 13—13 of FIG. 12.
Figure 14:
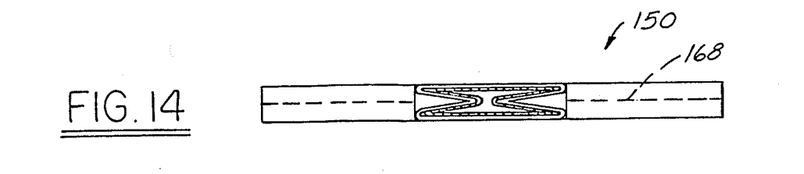
FIG. 14 is a end view of the flattened bag taken generally in the direction of the arrows 14—14 of FIG. 12.

For shipping and storage when empty, the side walls of the cage of the container are collapsed to conserve space and provide a compact package. For many applications the empty bag or bags therein and any foldable shield are collapsed within the cage before the walls of the cage are folded over its bottom. However, for some applications it may be desirable or even necessary to remove the bags therein from the cage before its side walls are folded. In such instances, the bags can still be folded with their flat panels and gussets disposed generally as shown in FIGS. 12-14 to provide a compact separate package facilitating storage and shipment.

After the walls of the cage have been set up as shown in FIG. 1, the shield and the bag or bags can be inserted in the cage if they are not already received therein. Either before or after insertion of the bag or bags, the discharge spout or spouts of any plastic film bag or bags are tied off or preferably heat sealed and then folded into any woven fabric outer bag through its outlet boot. The walls of the outlet boot are then folded up and tied or otherwise secured together through the eyelets therein. Any trap doors in the bottom of the cage are closed to support the bags when filled. If no trap doors are provided a bolt, straps, cord or other means can be extended across any access opening, drawn taught and secured to the bottom of the cage to provide support for the bags when filled.

The container is then filled with a liquid or granular material through the inlet spout. After filling, the inlet spout of any plastic film bag is closed off, such as by tying or preferably heat sealing and then the inlet spout or boot of any fabric outer bag is closed and tied off. If the container is filled with a liquid and the spout of the plastic film bag is tied off, the spout should be secured to the outer woven bag and tied up between the walls of the upper boot of the woven bag so that the spout extends generally outwardly with its free ends projecting out of the boot as discussed above and shown in FIGS. 5-8, to prevent a syphoning or capillary action from subsequently draining the liquid from the container.

To prevent movement of the material within the bag from producing sufficient force to damage or destroy the bag, the straps 100 are placed over the top of the outer fabric bag or the fabric top of the foldable shield and drawn up sufficiently to force the top of the bag or bags into firm engagement with the contents. If the material is a liquid, preferably the straps are shortened sufficiently to force out any air initially entrapped in the plastic film bag so that the liquid begins to rise in the filler spout. If the filler spout is to be heat sealed, it may be necessary to shorten or tension the straps before the filler spout is heat sealed and thereafter fold the sealed spout into any outer fabric bag.

The filled container can then be stored, transported and moved about until it is desired to remove its contents. If the bag has an outlet spout in its side the cap is removed and any plastic film underlying the spout pierced so that the liquid contents can flow out through the spout.

If the bag has a bottom spout, preferably its contents is removed through the bottom of the container while the bag is still in the cage. Usually, the container is lifted above the floor to provide access to the bottom and then any trap doors are opened to provide access to the outlet boot or spout of any outer bag and the spout of any plastic film bags therein. The cord is untied, or other securing means released, to open the outlet boot of the outer bag and, if there is no plastic film inner bag, the material is discharged through this boot. If there is a plastic film inner bag, its spout is pulled through any outer bag outlet or boot and then opened to discharge the contents.

If it is desired to intermittently discharge granular material from the container, a suitable valve assembly, such as the discharge valve assembly 86, can be installed to do so. If it is desired to. intermittently discharge liquid from the container, a suitable outlet tube and valve assembly, such as the assembly 120, can be installed and connected to the discharge spout to do so.

After the container has been emptied, any discharge valve assembly is disconnected and removed. Thereafter, the bag or bags preferably are collapsed within the cage or removed and folded into a compact arrangement for storage and shipment before reuse. With the bag or bags either therein or removed, but preferably therein, any foldable shield is folded and then the sidewalls of the cage are released, collapsed and folded over the bottom of the cage to provide a compact package for storage and shipment before reuse.

When it is desired to reuse the container, the walls of the cage are reassembled in the upright position, any foldable shield unfolded, and the bag or bags therein prepared for refilling in the manner already described so the container can be reused to store and ship granular or liquid materials.

We claim:

1. A collapsible bulk container comprising; a cage having a generally flat and generally rectangular and rigid bottom, rigid side walls and rigid end walls carried by said bottom, said walls being collapsible from a generally upstanding position wherein a bag can be received in said cage between said walls to a knocked down position whereby said walls overlie and extend generally parallel to said bottom, and said bottom being constructed and arranged to underlie, support and carrying the weight of the contents of a bag when full and received in said cage between said upstanding side walls, and a collapsible bag of a flexible material received in said cage and which has a generally rectangular top and a generally rectangular bottom interconnected by generally rectangular side walls, when said bag is full said bottom and side walls of said bag being generally complimentary to and supported by the associated bottom and side and end walls of said cage, said bag comprises a tubular blank of flexible material having a pair of flat overlying panels adapted to form a pair of opposite side walls of the bag and a pair of folded gusset panels extending inwardly between the flat panels from the opposite edges of the flat panels and adapted to form another pair of opposite side walls of said bag, said blank having adjacent its lower end each flat panel and adjacent gusset panel connected together along lines extending diagonally inwardly from the opposite side edges of the panels toward the lower end of the tubular blank, said diagonal lines of connection terminating at their laterally inward ends in spaced apart relation laterally outwardly of the inner folded edges of the gusset panels at points spaced from the lower end of the blank, each flat panel and the adjacent gusset panel also being connected together along a line extending lengthwise of the blank from said points to termination of the diagonal line to the lower end of the blank, each flat panel and the adjacent gusset panel being severed along lines spaced laterally outwardly of and generally co-extensive in length with said lengthwise extending lines of connection to form a discharge spout at the lower end of the bag which when open has a generally rectangular cross section, the portion of the flat panels and gusset panels lying between said diagonal connection lines forming when the blank is open said bottom wall of said bag, and an access opening through said cage and constructed and arranged so that the discharge spout can be extended through said opening to discharge the contents of said bag through said discharge spout.

2. The container of claim 1 wherein said bag also comprises a flexible filling spout located generally centrally in said top of said bag.

3. The container of claim 1 which also comprises a shield underlying each wall of said cage and disposed between such wall and said bag.

4. The container of claim 3 wherein said shield is of a flexible and high density plastic.

5. The container of claim 3 which also comprises a shield overlying said bottom of said cage and disposed between said bottom and said bag.

6. The container of claim 1 wherein said bottom and said walls of said cage comprise grids of wire of metal welded together at their intersections and said container also comprises a shield of a high density plastic overlying said bottom of said cage and disposed between such bottom and said bag and a shield of high density plastic underlying each wall of said cage and disposed between such wall and said bag.

7. The container of claim 1 wherein said access opening is located in said bottom of said cage, and which also comprises a trap door associated with said access opening through said bottom of said cage.

8. The container of claim 1 wherein said discharge spout is located in said bottom of said bag and said access opening is located in said bottom of said cage, and which also comprises a retainer belt having a releasable coupling, said retainer belt extending generally across said access opening through said bottom of said cage with its distal ends carried by said bottom of said cage.

9. The container of claim 1 wherein said bag is formed of a material which is impervious to water and the container also comprises a rigid outlet tube having a tapered portion which terminates at an end with a reduced outside diameter relative to the maximum outside diameter of the tube, said reduced diameter being less than the inside diameter of said flexible discharge spout of said bag, said outlet tube being constructed and arranged so that said tapered portion can be inserted into an open end of said discharge spout and a portion of said discharge spout can be clamped to said outlet tube to provide a liquid tight seal therebetween, whereby liquid contained in said bag can be discharge from said spout through said outlet tube.

10. The container of claim 9 which also comprises a clamp constructed and arranged to encircle a portion of said tube and discharge spout to urge them into firm engagement to provide a water-tight seal therebetween.

11. The container of claim 1 wherein said bag is formed of a flexible plastic film which is water impervious.

12. The container of claim 1 wherein said bag is formed of a fabric material.

13. The container of claim 1 which also comprises another bag received in said bag, said bag comprising a tubular blank having overlying flat panels and inwardly folded gusset panels of the same configuration as the corresponding panels of said bag, the lower end of said another bag having the flat panels and gusset panels connected together along lines corresponding to the diagonal lengthwise connection lines of said bag and being severed along lines corresponding to the lines of severing of said bag, whereby, when flattened, said another bag can be drawn through said bag when flattened with the gussets and spouts of said another bag and bag in interleaved and interfitting relation.

14. The container of claim 1 which also comprises a foldable shield receivable in said cage between said bag and cage when unfolded, said shield having a pair of generally opposed wall panels interconnected at their ends by gusset panels constructed and arranged to lie between the wall panels when the shield is folded, and when the bag is empty the shield can be folded to lie closely adjacent one of said walls of said cage and when said one wall is knocked down said folded shield will lie generally parallel to said bottom of said cage and underlie said one wall.

15. A collapsible bulk container comprising; a cage having a generally flat and generally rectangular and rigid bottom, rigid side walls and rigid end walls carried by said bottom, said walls being collapsible from a generally upstanding position wherein a bag can be received in said cage between said walls to a knocked down position wherein said walls overlie and extend generally parallel to said bottom, and said bottom being constructed and arranged to underlie, support and carry the weight of the contents of a cag when full and received in said cage between said upstanding side walls, a collapsible bag of a flexible material received in said cage and which has a generally rectangular top and a generally rectangular bottom interconnected by generally rectangular side walls, when said bag is full said bottom and side walls of said bag being generally complimentary to and supported by the associated bottom and side and end walls of said cage, a flexible discharge spout located in one of said side walls and bottom of said bag and at least immediately adjacent said bottom, an access opening through said cage and constructed and arranged so that the discharge spout can be extended through said opening to discharge the contents of said bag through said discharge spout, and at least two laterally spaced apart flexible straps each overlying and extending across the top of said bag with each of their generally opposed ends carried by a wall of said cage and each constructed and arranged to urge a portion of the top of said bag into firm engagement with the contents of said bag at least when said bag is substantially full, whereby the tendency of the contents of said bag to shift within said cage when the container is being moved is substantially decreased.

16. The container of claim 15 which also comprises a buckle operably associated with each strap to permit the adjustment within predetermined limits of the effective length of the strap with which it is associated.

17. The container of claim 15 which also comprises a pair of laterally spaced apart straps overlying and extending across the top of said bag generally transversely of such other straps and having their generally opposed ends connected to walls of said cage, and each of said straps being constructed and arranged to urge an underlying portion of the top of said bag into firm engagement with the contents thereof at least when said bag is substantially full, whereby the tendency of the contents to shift within said cage when the container is being moved is substantially decreased.

18. The combination of claim 17 which also comprises a buckle operably associated with each strap to permit the adjustment within predetermined limits of the effective length of the strap with which it is associated.

19. A collapsible bulk container comprising; a cage having a generally flat and generally rectangular and rigid bottom, rigid side walls and rigid end walls carried by said bottom, said walls being collapsible from a generally upstanding position wherein a bag can be received in said cage between said walls to a knocked down position wherein said walls overlie and extend generally parallel to said bottom, said bottom being constructed and arranged to underlie, support and carry the weight of the contents of a bag when full and received in said cage between said upstanding side walls, a collapsible bag of a flexible material received in said cage and which has a generally rectangular top and a generally rectangular bottom interconnected by generally rectangular side walls, when said bag is full said bottom and side walls of said bag being generally complimentary to and supported by the associated bottom and side and end walls of said cage, a flexible discharge spout located in said bottom of said bag, an access opening through said bottom of said cage and constructed and arranged so that the discharge spout can be extended through said opening to discharge the contents of said bag through said discharge spout, a first trap door associated with said access opening through said cage, said first trap door having a opening therethrough through which the discharge spout of said bag can be extended, and a second trap door carried by said first trap door and associated with said opening through said first trap door.

20. A collapsible bulk container comprising; a cage having a generally flat and generally rectangular and rigid bottom, rigid side walls and rigid end walls carried by said bottom, said walls being collapsible from a generally upstanding position wherein a bag can be received in said cage between said walls to a knocked down position wherein said walls overlie and extend generally parallel to said bottom, said bottom being constructed and arranged to underlie, support and carry the weight of the contents of a bag when full and received in said cage between said upstanding side walls, a collapsible bag of a flexible material received in said cage and which has a generally rectangular top and a generally rectangular bottom interconnected by generally rectangular side walls, when said bag is full said bottom and side walls of said bag being generally complimentary to and supported by the associated bottom and side and end walls of said cage, a flexible discharge spout located in said bottom of said bag, an access opening through said bottom of said cage and constructed and arranged so that the discharge spout can be extended through said opening to discharge the contents of said bag through said discharge spout, support means on one of said cage and said bag and spaced around said discharge spout, a discharge valve casing, connectors detachably suspending said casing from said support means in a position generally aligned with and underlying said spout, said spout when extended and opened extending downwardly into said valve casing, and a valve member carried by said casing and located below the lower end of the extended spout so that it is operable both to permit and to arrest flow of the contents of the bag downwardly therethrough while the spout is in its extended position.

21. The container of claim 20 wherein said valve casing comprises a hopper having an open upper end.

22. The container of claim 20 which also comprises a flexible tubular boot projecting downwardly from the bottom wall of the bag and encircling said discharge spout, said support means being secured to said boot.

23. The container of claim 22 wherein said boot is collapsible to a condition wherein it underlies the spout when collapsed and includes means for retaining the boot in its collapsed condition.

24. The container of claim 20 which also comprises another bag made of a plastic film and disposed in and generally complimentary with said bag and said discharge spout defines a bottom discharge outlet of said another bag.

25. A collapsible bulk container comprising; a cage having a generally flat and generally rectangular and rigid bottom, rigid side walls and rigid end walls carried by said bottom, said walls being collapsible from a generally upstanding position wherein a bag can be received in said cage between said walls to a knocked down position wherein said walls overlie and extend generally parallel to said bottom, said bottom being constructed and arranged to underlie, support and carry the weight of the contents of a bag when full and received in said cage between said upstanding side walls, a collapsible bag of a flexible material received in said cage and which has a generally rectangular top and a generally rectangular bottom interconnected by generally rectangular side walls, when said bag is full said bottom and side walls of said bag being generally complimentary to and supported by the associated bottom and side and end walls of said cage, a flexible discharge spout located in one of said side walls and bottom of said bag and at least immediately adjacent said bottom, and an access opening through said cage and constructed and arranged so that the discharge spout can be extended through said opening to discharge the contents of said bag through said discharge spout, said bag being formed of a material which is impervious to water, said container also comprises a rigid outlet tube having a tapered portion which terminates at an end with a reduced outside diameter relative to the maximum outside diameter of the tube, said reduced diameter being less than the inside diameter of said flexible discharge spout of said bag, said outlet tube being constructed and arranged so that said tapered portion can be inserted into an open end of said discharge spout and a portion of said discharge spout can be clamped to said outlet tube to provide a liquid tight seal therebetween, wherein said discharge spout is of sufficient length relative to said outlet tube so that when said tapered portion is inserted therein, there is a sufficient area between said one end of said tube and said bottom of said bag so that a portion of said discharge spout upstream of said one end of said tube can be releasably clamped together to prevent the contents of said bag from passing through said spout while said tapered portion of said tube is being inserted therein, and a portion of said spout is initially clamped to said tube to provide a liquid-tight seal therebetween, whereby liquid contained in said bag can be discharged from said spout through said outlet tube when such clamp is released.

26. The container of claim 25 which also comprises another collapsible bag disposed within said bag, having a discharge spout received within said discharge spout of said bag, and being formed of a flexible material which is water impervious.

27. The container of claim 26 wherein said flexible material is a plastic film.

28. A collapsible bulk container comprising; a cage having a generally flat and generally rectangular and rigid bottom, rigid side walls and rigid end walls carried by said bottom, said walls being collapsible from a generally upstanding position wherein a bag can be received in said cage between said walls to a knocked down position wherein said walls overlie and extend generally parallel to said bottom, said bottom being constructed and arranged to underlie, support and carry the weight of the contents of a bag when full and received in said cage between said upstanding side walls, and a collapsible bag of flexible material received in said cage and which has a generally rectangular top and a generally rectangular bottom interconnected by generally rectangular side walls, when said bag is full said bottom and side walls of said bag being generally complimentary to and supported by the associated bottom and side and end walls of said cage, a flexible discharge spout located in one of said side walls and bottom of said bag and at least immediately adjacent said bottom, an access opening through said cage and constructed and arranged so that the discharge spout can be extended through said opening to discharge the contents of said bag through said discharge spout, and another collapsible bag disposed in said bag, having a generally rectangular bottom and a generally rectangular top interconnected by generally rectangular side walls and a flexible discharge spout located in one of said side and bottom walls thereof, and wherein said top, bottom, side walls, and discharge spout thereof are generally complimentary with said bag, and said bag and said another bag each being formed of a flexible plastic film which is water impervious.

29. A collapsible bulk container comprising a cage having a generally flat and generally rectangular and rigid bottom, rigid side walls and rigid end walls carried by said bottom, said walls being collapsible from a generally upstanding position wherein a bag can be received in said cage between said walls to a knocked down position wherein said walls overlie and extend generally parallel to said bottom, said bottom being constructed and arranged to underlie, support and carry the weight of the contents of a bag when full and received in said cage between said upstanding side walls, and a collapsible bag of a flexible material received in said cage and which has a generally rectangular top and a generally rectangular bottom interconnected by generally rectangular side walls, when said bag is full said bottom and side walls of said bag being generally complimentary to and supported by the associated bottom and side and end walls of said cage, a flexible discharge spout located in one of said side walls and bottom of said bag and at least immediately adjacent said bottom, an access opening through said cage and constructed and arranged so that the discharge spout can be extended through said opening to discharge the contents of said bag through said discharge spout, another collapsible bag disposed within said bag and having a discharge spout located adjacent its bottom and a flexible filler spout located generally centrally in its top, said bag also comprising a flexible boot encircling said filler spout, located generally centrally in said top of said bag, having an open end through which said filler spout can extend, and four circumferentially space holes through said boot adjacent its open end, a tie closing off and at least substantially sealing said filler spout of said another bag, and a cord with its bight secured to the boot through a first one of the holes and its runs passing around opposite sides of the filler spout and thence through a second hole in the bottom generally opposite said first hole, thereafter one of the runs passing through a third hole in the boot and the other run passing through a fourth hole in the boot generally opposite to said third hole, and with the cord being drawn tight and the runs secured together to thereby draw the end portion of the boot snugly around the filler spout to retain the portion of the filler spout adjacent its free end above the top of said another bag, whereby synphoning out liquid from said another bag through said filler spout is prevented.

30. The container of claim 29 wherein said bag is formed of a fabric material.

31. A collapsible bulk container comprising; a cage having a generally flat and generally rectangular and rigid bottom, rigid side walls and rigid end walls carried by said bottom, said walls being collapsible from a generally upstanding position wherein a bag can be received in said cage between said walls to a knocked down position wherein said walls overlie and extend generally parallel to said bottom, said bottom being constructed and arranged to underlie, support and carry the weight of the contents of a bag when full and received in said cage between said upstanding side walls, a collapsible bag of a flexible material received in said cage and which has a generally rectangular top and a generally rectangular bottom interconnected by generally rectangular side walls, when said bag is full said bottom and side walls of said bag being generally complimentary to and supported by the associated bottom and side and end walls of said cage, a flexible discharge spout located in one of said side walls and bottom of said bag and at least immediately adjacent said bottom, an access opening through said cage and constructed and arranged so that the discharge spout can be extended through said opening to discharge the contents of said bag through said discharge spout, a foldable shield receivable in said cage between said bag and cage when unfolded, said shield having a pair of generally opposed wall panels interconnected at their ends by gusset panels constructed and arranged to lie between the wall panels when the shield is folded, and when the bag is empty the shield can be folded to lie closely adjacent one of said walls of said cage, connector means attached to one of said wall panels of said shield and constructed and arranged to attach such wall panel to one of said walls of said cage, and when said one wall of said cage is knocked down said folded shield will lie generally parallel to said bottom of said cage and underlie said one wall.

32. The container of claim 31 wherein said foldable shield also comprises a bottom of a flexible material attached to the lower edge of said panels of said shield and constructed and arranged to lie between said bag and said bottom of said cage when said bag is filled with material and to be received between said panels of said shield when such shield is folded.

33. The container of claim 32 wherein said foldable shield also comprises a top of a flexible material attached adjacent one edge to one of said wall panels of said shield adjacent the upper edge of said one wall panel.

34. The container of claim 32 wherein said bag is made of a plastic film and said discharge spout comprises a tube of plastic sealed to said plastic film of said bag.

35. The container of claim 34 which also comprises another bag of a plastic film in which said bag is received, and said tube is sealed to and projects outwardly of said plastic film of said another bag.

36. The container of claim 31 wherein said panels of said shield are made of a sheet of a self supporting and flexible plastic material which is sealed together adjacent its opposed ends, and with the adjacent ends of adjacent panels of said shield being integrally and hingedly connected together.

37. A collapsible bulk container comprising; a cage having a generally flat and generally rectangular and rigid bottom, rigid side walls and rigid end walls carried by said bottom, said walls being collapsible from a generally upstanding position wherein a bag can be received in said cage between said walls to a knocked down position wherein said walls overlie and extend generally parallel to said bottom, said bottom being constructed and arranged to underlie, support and carry the weight of the contents of a bag when full and received in said cage between said upstanding side walls, a collapsible bag of a flexible material received in said cage and which has a generally rectangular top and a generally rectangular bottom interconnected by generally rectangular side walls, when said bag is full said bottom and side walls of said bag being generally complimentary to and support by the associated bottom and side and end walls of said cage, a flexible discharge spout located in one of said side walls and bottom of said bag and at least immediately adjacent said bottom, an access opening through said cage and constructed and arranged so that the discharge spout can be extended through said opening to discharge the contents of said bag through said discharge spout, said bag is made of a plastic film, said discharge spout includes a tube of plastic, and a portion of said plastic film extends across the inlet of said tube and is sealed to said tube circumferentially continuously around and encircling such inlet to prevent a liquid in said bag from flowing out through said tube until such portion of plastic film extending across such inlet is pierced.

38. The container of claim 37 which also comprises another bag of a plastic film in which said bag is received, and said tube is sealed to and projects outwardly of said plastic film of said another bag.

39. The container of claim 38 wherein said spout is located in a side of said bags and closely adjacent the bottom of said bags.

* * * * *